(12) United States Patent
Ijames, Jr.

(10) Patent No.: US 9,970,488 B2
(45) Date of Patent: May 15, 2018

(54) CLUTCH DISC WITH RESILIENTLY DEFORMABLE DAMPING WEB AND METHOD OF MANUFACTURING SAME

(71) Applicant: Ace Manfacturing and Parts Co., Sullivan, MO (US)

(72) Inventor: Kevin M. Ijames, Jr., Sullivan, MO (US)

(73) Assignee: ACE Manufacturing and Parts Co., Sullivan, MO (US)

( * ) Notice: Subject to any disclaimer, the term of this patent is extended or adjusted under 35 U.S.C. 154(b) by 22 days.

(21) Appl. No.: 14/701,183

(22) Filed: Apr. 30, 2015

(65) Prior Publication Data

US 2016/0319889 A1 Nov. 3, 2016

(51) Int. Cl.

| F16D 13/68 | (2006.01) |
| F16D 13/70 | (2006.01) |
| B29C 39/10 | (2006.01) |
| F16D 13/38 | (2006.01) |
| F16D 13/64 | (2006.01) |
| B29K 75/00 | (2006.01) |
| B29K 105/00 | (2006.01) |
| B29L 31/30 | (2006.01) |
| F16D 3/76 | (2006.01) |

(52) U.S. Cl.
CPC ............ *F16D 13/686* (2013.01); *B29C 39/10* (2013.01); *F16D 13/385* (2013.01); *F16D 13/644* (2013.01); *F16D 13/70* (2013.01); B29K 2075/00 (2013.01); B29K 2105/0058 (2013.01); B29L 2031/3055 (2013.01); F16D 3/76 (2013.01); F16D 2300/10 (2013.01); F16D 2300/12 (2013.01); F16D 2300/22 (2013.01)

(58) Field of Classification Search
CPC ..................................................... F16D 13/686
See application file for complete search history.

(56) References Cited

U.S. PATENT DOCUMENTS

| 1,964,054 | A | | 6/1934 | Harris | |
| 1,976,063 | A | * | 10/1934 | Evans | ................... F16D 13/686 |
| | | | | | 192/70.18 |
| 2,104,106 | A | | 1/1938 | Swennes | |
| 2,299,029 | A | | 10/1942 | Nutt | |
| 2,397,642 | A | | 4/1946 | Blazek et al. | |
| 2,514,139 | A | | 7/1950 | O'Connor | |
| 2,556,624 | A | | 6/1951 | MacBeth et al. | |
| 3,148,756 | A | | 9/1964 | Romanini | |
| 3,232,077 | A | | 2/1966 | Binder | |

(Continued)

*Primary Examiner* — Mark A Manley
(74) *Attorney, Agent, or Firm* — David E. Crawford; Crawford IP Law

(57) ABSTRACT

A friction disc. The friction disc includes a plate having a forward facing plate surface, a rearward facing plate surface, an inward facing plate surface, and an outward facing plate surface. An inward facing plate surface has a plate lug extending radially inwardly. The friction disc includes a hub having an inward facing hub surface and an outward facing hub surface. The outward facing hub surface has a hub lug extending radially outwardly. The friction disc includes a damping web connecting the plate to the hub to transmit torque between the plate and the hub to rotate the plate and the hub mutually. The damping web includes a resiliently deformable material that limits transmission of shock between the plate and the hub.

19 Claims, 17 Drawing Sheets

(56) References Cited

U.S. PATENT DOCUMENTS

| | | | |
|---|---|---|---|
| 3,245,229 A | | 4/1966 | Fadler |
| 3,298,487 A | | 1/1967 | Tolksdorf et al. |
| 3,650,361 A | * | 3/1972 | Fossum ...................... 192/30 V |
| 4,197,931 A | * | 4/1980 | Norcia .................. F16D 13/686 |
| | | | 192/203 |
| 4,249,396 A | | 2/1981 | Ziegler |
| 4,493,407 A | * | 1/1985 | Newton ................ F16D 13/686 |
| | | | 192/200 |
| 4,558,773 A | | 12/1985 | Schafer |
| 4,763,767 A | | 8/1988 | Lanzarini et al. |
| 4,913,275 A | | 4/1990 | Kobayashi et al. |
| 5,036,964 A | * | 8/1991 | Booth ......................... 192/84 C |
| 5,213,544 A | * | 5/1993 | Wolf ........................ F16D 3/68 |
| | | | 464/85 |
| 5,662,200 A | | 9/1997 | Memmel et al. |

* cited by examiner

CLUTCH DISC WITH RESILIENTLY DEFORMABLE DAMPING WEB AND METHOD OF MANUFACTURING SAME

BACKGROUND

The present disclosure relates generally to friction clutches, and more particularly to a clutch assembly having a resiliently deformable damping web to dampen shock transmitted between a friction plate and a hub of a friction disc thereby reducing shock transmitted through the clutch assembly.

Friction clutches are widely used in automotive vehicles to selectively connect a driving member, such as an engine's crankshaft, to a driven member, such as a transmission input shaft. A typical friction clutch includes a friction disc that is connected to the transmission shaft so that, when the friction disc is rotated, the transmission shaft rotates with the friction disc. A pressure plate and flywheel are each connected to the crankshaft for rotation with the crankshaft. The pressure plate is selectively moveable to clamp the friction disc against the fly wheel. When the flywheel engages the friction disc, the friction disc rotates with the pressure plate and crankshaft to drive the transmission shaft. The initial engagement between the flywheel and the clutch disc can impart large acceleration loads or shock to the friction disc and transmission shaft.

To limit the transmission of shock, most friction discs include a mechanism joining the friction plate and hub to dampen shock transmitted through the clutch assembly to the transmission. These mechanisms allow resilient circumferential movement between the friction plate and hub when the pressure plate initially engages the friction disc to dampen shock transmitted to the hub. The resilience of the mechanisms returns the friction plate and hub to their initial relative circumferential positions after the circumferential movement. For example, some of these mechanisms include circumferentially mounted coil springs, each of which has one end connected to the hub and another end connected to the friction plate. As those skilled in the art will appreciate, corresponding connectors and retainers are typically provided for holding the springs and the various components must be assembled to form the friction disc, resulting in complexity and expense. Accordingly, an improved damping mechanism and method of manufacture are needed.

SUMMARY

In one aspect, the current disclosure relates to a friction disc for use in a clutch assembly. The friction disc comprises a plate having a forward facing plate surface, a rearward facing plate surface opposite the forward facing plate surface, an inward facing plate surface, and an outward facing plate surface opposite the inward facing plate surface. Either or both of the forward facing plate surface and the rearward facing plate surface are configured to operatively engage a rotatable driving member for mutual rotation. The inward facing plate surface has a plate lug extending radially inwardly from it. The friction disc also includes a hub having an inward facing hub surface and an outward facing hub surface opposite the inward facing hub surface. The inward facing hub surface is configured to operatively engage a driven member for mutual rotation with it. The outward facing hub surface has a hub lug extending radially outwardly from it. In addition, the friction disc includes a damping web connecting the plate to the hub to transmit torque between the plate and the hub to rotate the plate and the hub mutually. The damping web comprises a resiliently deformable material that limits transmission of shock between the plate and the hub. The damping web includes an inner portion having an inner surface and an outer portion having an outer surface. The outer surface of the damping web has an outer recess extending into the outer portion for receiving the radially inwardly extending plate lug in it to inhibit circumferential movement of the outer surface of the damping web relative to the plate. The inner surface of the damping web has an inner recess extending into the inner portion for receiving the radially outwardly extending hub lug in it to inhibit circumferential movement of the inner surface of the damping web relative to the hub.

In another aspect, the current disclosure relates to a method of manufacturing a friction disc. The method comprises securing a plate and a hub in a mold so that the plate and hub are coaxially aligned. The plate has a central opening and a plate lug extending radially into the central opening. The hub has a hub lug extending radially outwardly from the hub. The mold forms a void extending between and surrounding the plate lug and the hub lug. The method includes filling the void formed by the mold with a curable material so the material overlaps and encases the plate lug and the hub lug. The material is resiliently deformable when cured. In addition, the method includes curing the curable material in the mold to form a damping web, and demolding the plate, the hub, and the damping web to provide the friction disc. The damping web includes an inner portion that is circumferentially fixed to the hub. The damping web also includes an outer portion adjacent the plate that is circumferentially fixed to the plate, so the plate and the hub are resiliently moveable relative to each other, and the damping web limits transmission of shock between the plate and the hub.

In another aspect, the current disclosure relates to a clutch comprising a pressure plate selectively movable along an axis of the clutch. The pressure plate is connected to a driving member for mutual rotation with it. The clutch includes a friction disc connected to a driven member for mutual rotation with it. The friction disc comprises a plate having a forward facing plate surface, a rearward facing plate surface opposite the forward facing plate surface, an inward facing plate surface, and an outward facing plate surface opposite the inward facing plate surface. Either the forward facing plate surface or the rearward facing plate surface or both are configured to operatively engage the pressure plate for mutual rotation with the driving member. The inward facing plate surface has a plate lug extending radially inwardly from it. The friction disc includes a hub having an inward facing hub surface and an outward facing hub surface opposite the inward facing hub surface. The inward facing hub surface is rotationally fixed to the driven member for mutual rotation with it. The outward facing hub surface has a hub lug extending radially outwardly from it. Further, the disc includes a damping web connecting the plate to the hub to transmit torque between the plate and the hub to rotate the plate and the hub mutually. The damping web comprises a resiliently deformable material that limits transmission of shock between the plate and the hub. The damping web also includes an inner portion having an inner surface and an outer portion having an outer surface. The outer surface of the damping web has an outer recess extending into the outer portion for receiving the radially inwardly extending plate lug in it to inhibit circumferential movement of the outer surface of the damping web relative to the plate. The inner surface of the damping web has an inner recess extending into the inner portion for receiving the radially outwardly extending hub lug in it to inhibit circumferential movement of the inner surface of the damping web relative to the hub.

In still another aspect, the current disclosure relates to a friction disc for use in a clutch assembly. The friction disc comprises a plate having a forward facing plate surface, a rearward facing plate surface opposite the forward facing plate surface, an inward facing plate surface, and an outward facing plate surface opposite the inward facing plate surface. The forward facing plate surface and/or the rearward facing plate surface are configured to operatively engage a rotatable driving member for mutual rotation with it. The inward facing plate surface has a plate lug extending radially inwardly from it. The plate lug has a circumferential width extending between opposite circumferential ends and a radial height less than the width. Each of the opposite circumferential ends extends along a straight line. The disc also includes a hub having an inward facing hub surface and an outward facing hub surface opposite the inward facing hub surface. The inward facing hub surface is configured to operatively engage a driven member for mutual rotation with it. Further, the disc has a damping web connecting the plate to the hub to transmit torque between the plate and the hub to rotate the plate and the hub mutually. The damping web comprises a resiliently deformable material that limits transmission of shock between the plate and the hub. The damping web includes an inner portion having an inner surface and an outer portion having an outer surface. The outer surface of the damping web has an outer recess extending into the outer portion for receiving the radially inwardly extending plate lug in it to inhibit circumferential movement of the outer surface of the damping web relative to the plate. The inner surface of the damping web receives a portion of the hub to inhibit circumferential movement of the inner surface of the damping web relative to the hub.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
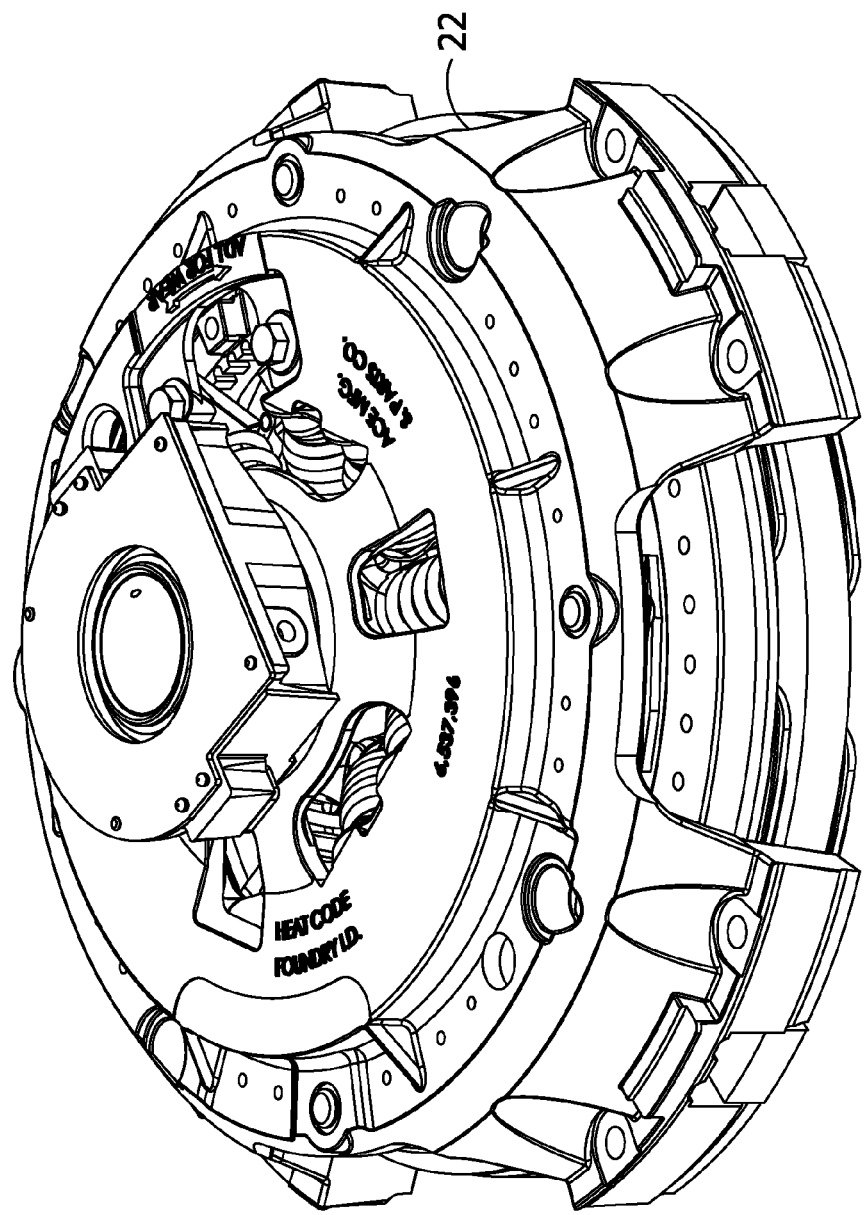
FIG. 1 is a perspective of a clutch assembly.
Figure 2:
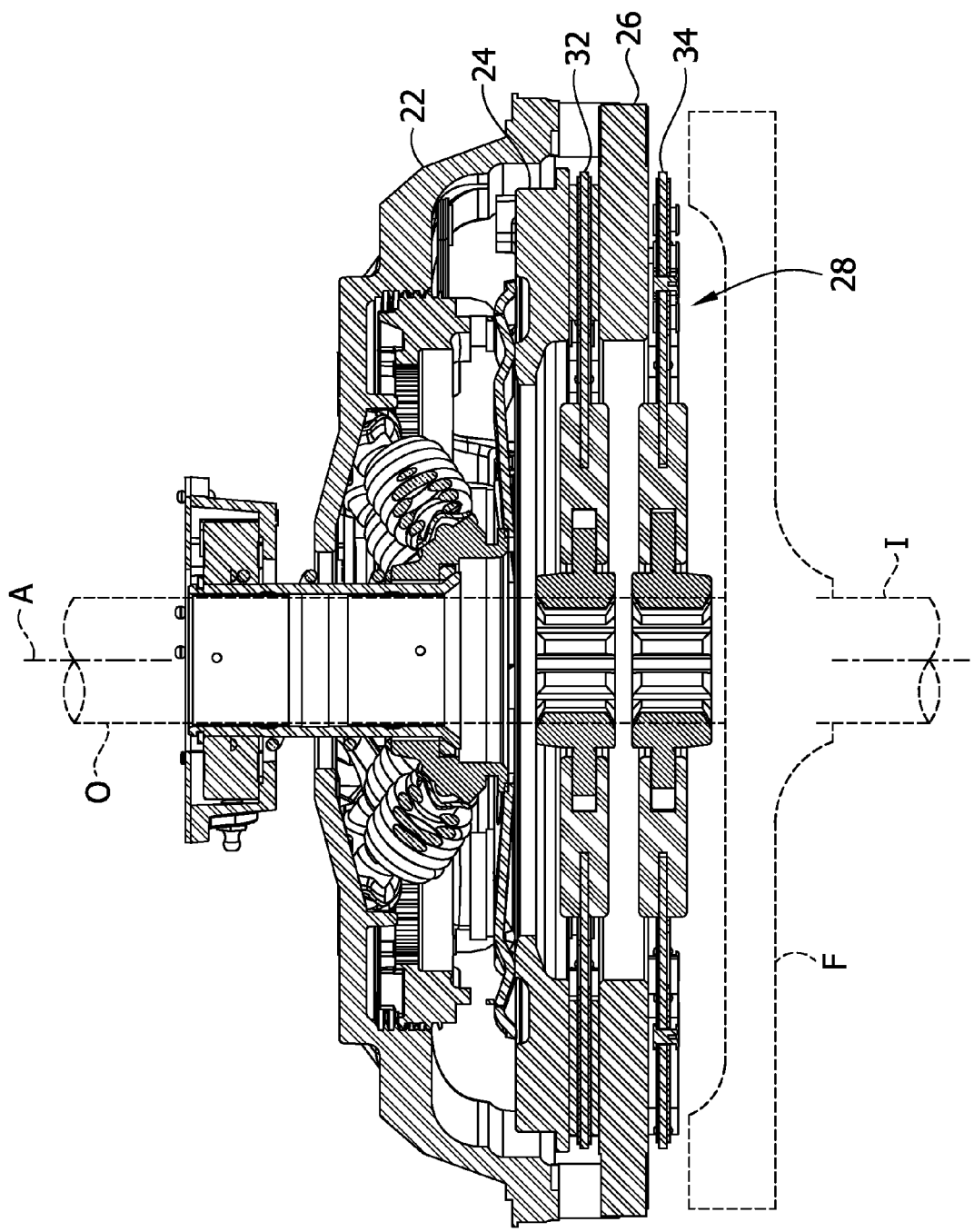
FIG. 2 is a cross section of the clutch assembly.
Figure 3:
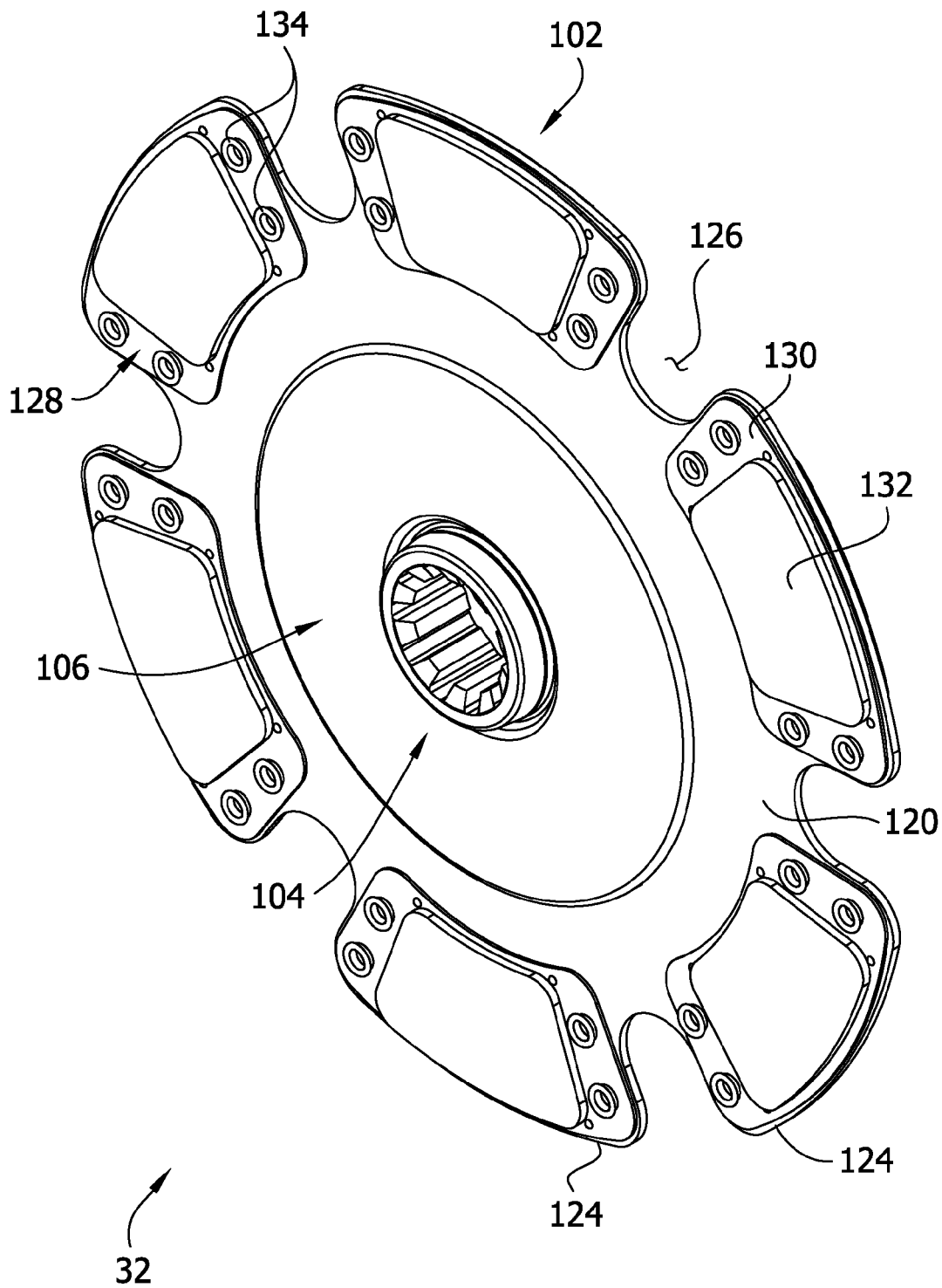
FIG. 3 is a perspective of a friction disc of the clutch assembly.

Referring to FIGS. 1 and 2, a clutch assembly is designated in its entirety by the reference number 20. As will be appreciated by those skilled in the art, the clutch assembly 20 selectively interconnects a driving member or shaft I, such as an engine crankshaft of an automobile, with a driven member or shaft O, such as a transmission gearbox input shaft. The driving member I and the driven member O are operatively connected through the clutch assembly 20 so torque can be transmitted between the shafts when the driving member rotates. A vehicle operator actuates the clutch assembly 20 to disengage the clutch, interrupting torque transmission between the shafts I, O, allowing the operator to shift gears in a vehicle transmission. As will be apparent to one skilled in the art, the clutch assembly 20 includes a damping mechanism that limits the transmission of shock between the driving and driven members I, O. Moreover, the damping mechanism can be easily manufactured using a simple mold, with minimal additional assembly.

As shown in FIG. 2, the clutch assembly 20 includes a cover 22, a primary pressure plate 24, a secondary pressure plate 26, and a friction disc assembly generally designated by 28, all of which are coaxially aligned on a common central axis A. In operation, the cover 22 is fixedly connected to a flywheel F mounted on the driving member I so the cover rotates in unison with the flywheel and driving member about the central axis A. The primary and secondary pressure plates 24, 26 are fastened to the cover so they also rotate in unison with the cover. The primary pressure plate 24 is axially movable with respect to the cover 22 between an engaged position and a disengaged position. In the engaged position, the primary pressure plate 24 is forced against the friction disc assembly 28 so torque is transmittable between the pressure plate and disc assembly.

In the illustrated embodiment, the friction disc assembly 28 includes a first friction disc 32 and a second friction disc 34 that are substantially identical to one another. It will be understood that other numbers of friction discs and friction discs of different types can be used in a clutch assembly or friction disc assembly without departing from the scope of the invention. As discussed in further detail below, each of the first and second friction discs 32, 34 has a central opening with at least one alignment formation configured to rotationally fix the friction disc to the driven member O so the friction disc turns in unison with the driven member. As will be understood by the skilled artisan, as the primary pressure plate 24 is forced against the first friction disc 32, the first friction disc is forced against the secondary pressure plate 26, the secondary pressure plate is forced against the second friction disc 34, and the second friction disc is forced against the flywheel F. When the primary and secondary pressure plates 24, 26 engage the friction disc assembly 28, the clutch assembly 20 transmits torque between the driving member I and the driven member O so the driven member turns with the driving member. In the disengaged position, the primary and secondary pressure plates 24, 26 release the friction discs 32, 34, allowing the friction disc assembly 28 to rotate independently from the pressure plates.

Reference is now made to the first friction disc 32 with the understanding that the description set forth applies equally to the second friction disc 34, and with the further understanding that the second friction disc is configured to operatively engage the second pressure plate 26 and flywheel F as the first friction disc engages the first pressure plate 24 and the second pressure plate. As will be apparent to those skilled in the art, the friction disc 32 is adapted to transmit torque between the driving member I and the driven member O and to limit transmission of shock to the driven member upon engagement with the primary and secondary pressure plates 24, 26. Referring to FIGS. 3-6, the friction disc 32 includes a friction plate 102, a hub 104, and a damping web 106 connecting the friction plate to the hub. As will be discussed in further detail below, both the friction plate 102 and hub 104 have an interlocking formation that the web 106 is molded around to circumferentially fix an outer portion of the web to the plate and an inner portion of the web to the hub.

Figure 7:
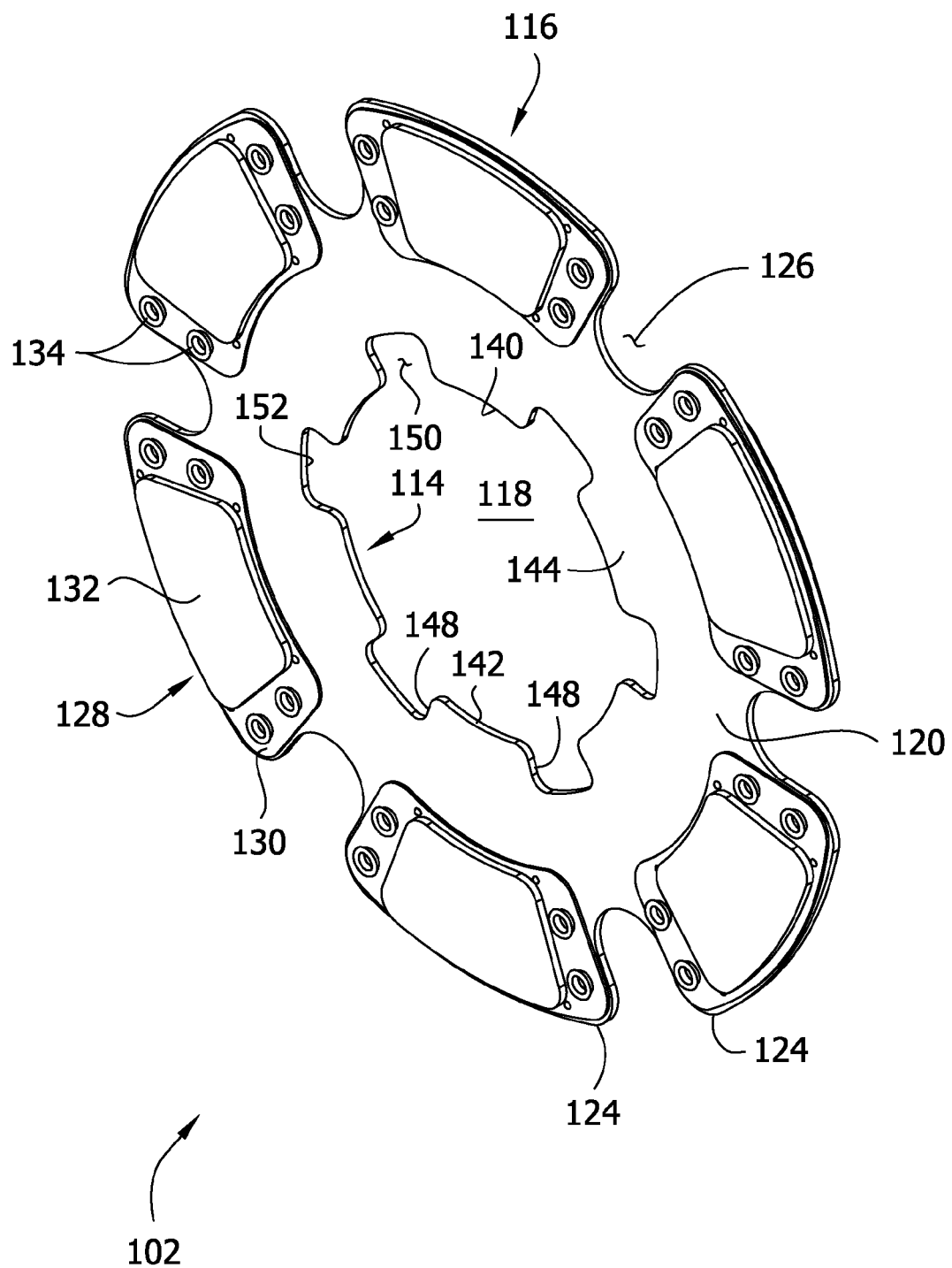
FIG. 7 is a perspective of a friction plate of the friction disc.
Figure 8:
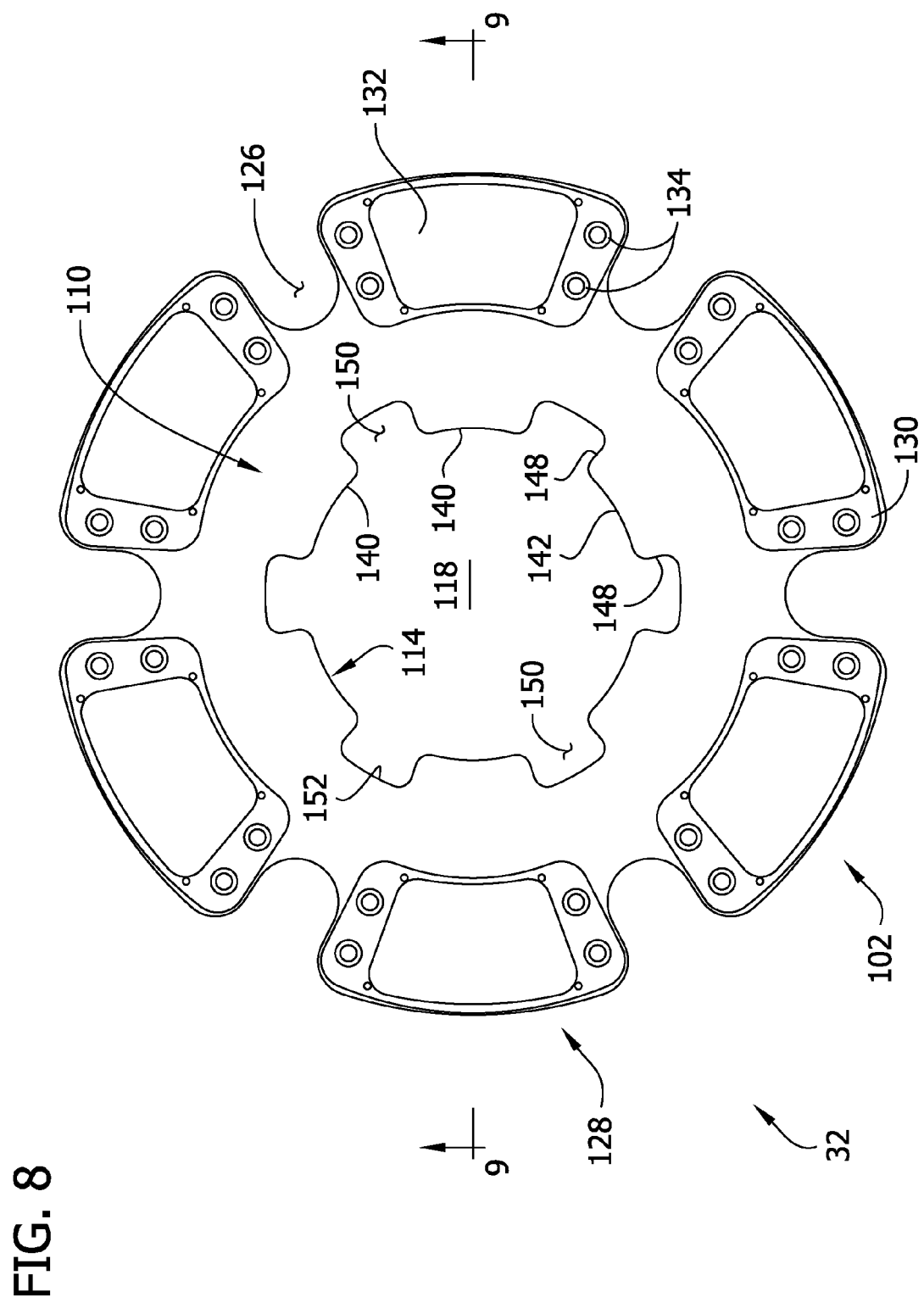
FIG. 8 is a front elevation of the friction plate.
Figure 9:
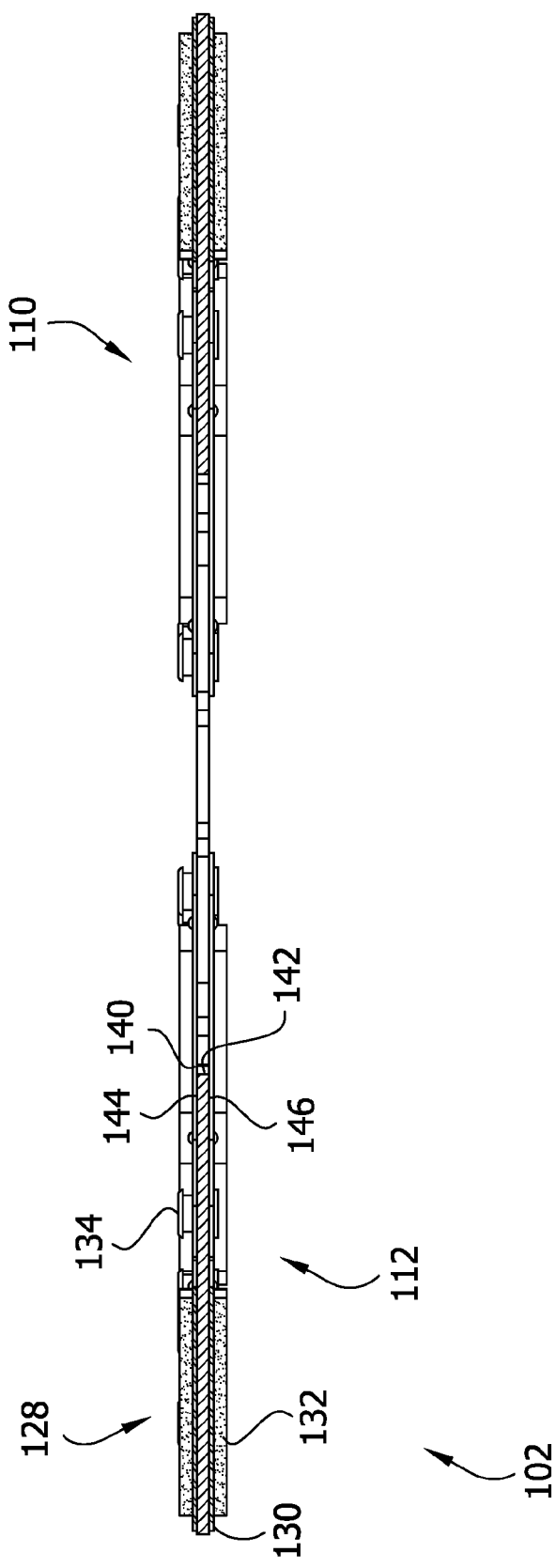
FIG. 9 is a section taken in the plane of line 9-9 of FIG. 8.

Referring to FIGS. 7-9, the illustrated friction plate 102 is configured to selectively engage the primary and secondary pressure plates 24, 26 for mutual rotation with the driving member I. The friction plate 102 has a forward facing plate surface, generally designated by 110, and a rearward facing plate surface, generally designated by 112, opposite the forward facing plate surface. An inward facing plate surface, generally designated by 114, opposite an outward facing plate surface, generally designated by 116, bounds a central plate opening 118 extending axially through the friction plate 102. Portions of each of the forward and rearward facing plate surfaces 110, 112 are configured to operatively engage the primary and secondary pressure plates 24, 26, and thereby operatively engage the driving member I for mutual rotation therewith. In one or more embodiments, only one of the forward and rearward facing plate surfaces can be configured to operatively engage the driving member without departing from the scope of the invention.

The friction plate 102 is a multi-component assembly providing high friction interfaces with the primary and secondary pressure plates 24, 26. A disc-shaped base plate 120 has six radial blades or fins 124 extending outwardly. Adjacent pairs of the blades 124 are separated by a respective gap 126 extending radially inward toward the central plate opening 118. It will be understood that a friction plate can be shaped differently without departing from the scope of the invention. For example, the shape and number of the blades can be varied without departing from the scope of the present invention. A friction pad assembly, generally designated by 128, is mounted on the forward and rearward facing surfaces of each of the blades 124 to provide a high strength, high friction structure for engaging the primary and secondary pressure plates 24, 26. Each friction pad assembly 128 includes a base member 130 and a friction pad 132 formed from high energy friction material made from metals and/or nonmetals that is fixed to the base member (e.g., with adhesive). Holes in the base members 130 of each corresponding pair of front and rear friction pad assemblies 128 align with holes in the blade 124 of the base plate 120 to which they are attached to receive rivets 134, which mount the friction pad assemblies to the blades.

The inward facing plate surface 114 of the friction plate 102 has interlocking features that engage complementary features of the damping web 106 to inhibit relative movement between the friction plate and an outer portion of the damping web. The inward facing plate surface 114 has a six circumferentially spaced plate lugs 140 extending inwardly into the central plate opening 118 from the inward facing plate surface. Although the illustrated embodiment includes six plate lugs 140, other numbers of plate lugs (e.g., one or more) may also be used without departing from the scope of the invention. Each plate lug 140 has an inward facing lug surface 142, forward facing lug surface 144, rearward facing lug surface 146, and opposite side lug surfaces 148. The plate lugs 140 each have an axial thickness extending from the forward facing lug surface 144 to the rearward facing lug surface 146 and a circumferential width extending between the side lug surfaces 148. The width of each plate lug 140 is larger than the thickness. As will discussed in further detail below, each plate lug 140 is configured to be encased by the damping web 106 such that each of the inward facing, forward facing, rearward facing, and side lug surfaces 142, 144, 146, 148 contact the web and form an interface therewith. Engagement between the side lug surfaces 148 of a plate lug 140 and the damping web 106 aligns the friction plate 102 to the outer portion of the damping web to inhibit relative circumferential movement between the friction plate and the outer portion of the damping web. Engagement between the forward and rearward facing lug surfaces 144, 146 and the damping web 106 inhibits relative axial movement between the friction plate 102 and the damping web.

Each adjacent pair of the circumferentially spaced plate lugs 140 is separated by a corresponding plate gap 150. Although the illustrated embodiment includes six plate gaps 150, the plate 102 may have other numbers of plate gaps (e.g., one or more) to accommodate other numbers of plate lugs without departing from the scope of the invention. Each plate gap 150 is bounded by an inward facing surface 152 and adjacent side surfaces 148 of an adjacent pair of plate lugs 140. In the illustrated embodiment, each of the gaps 150 is somewhat dovetail-shaped, with each gap being narrower at an inner end than an outer end. As will be discussed in greater detail below, each of the plate gaps 150 is configured to receive a portion of the damping web 106 to aid in fixing the friction plate 102 to the outer portion of the damping web.

Figure 10:
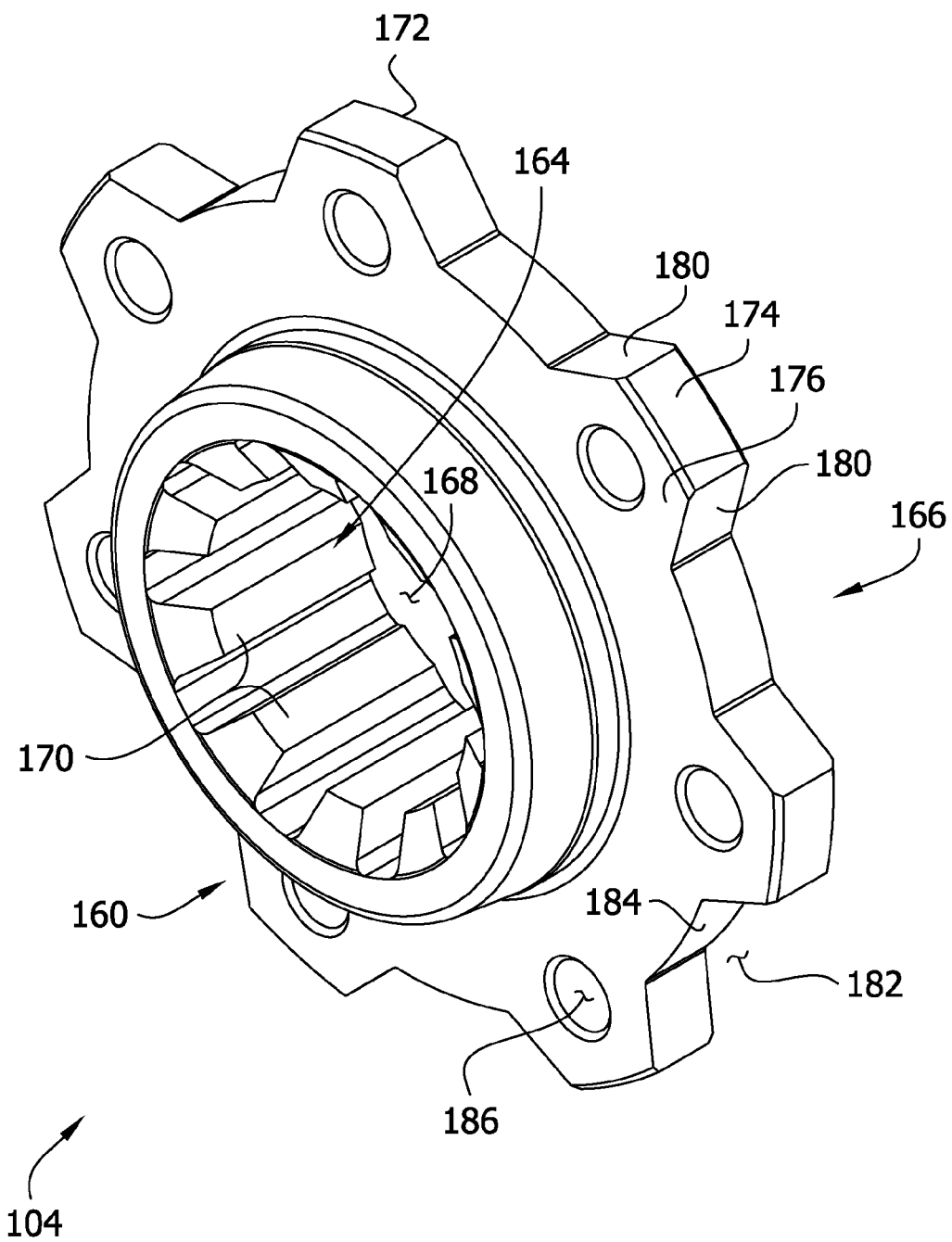
FIG. 10 is a perspective of a hub of the friction disc.
Figure 11:
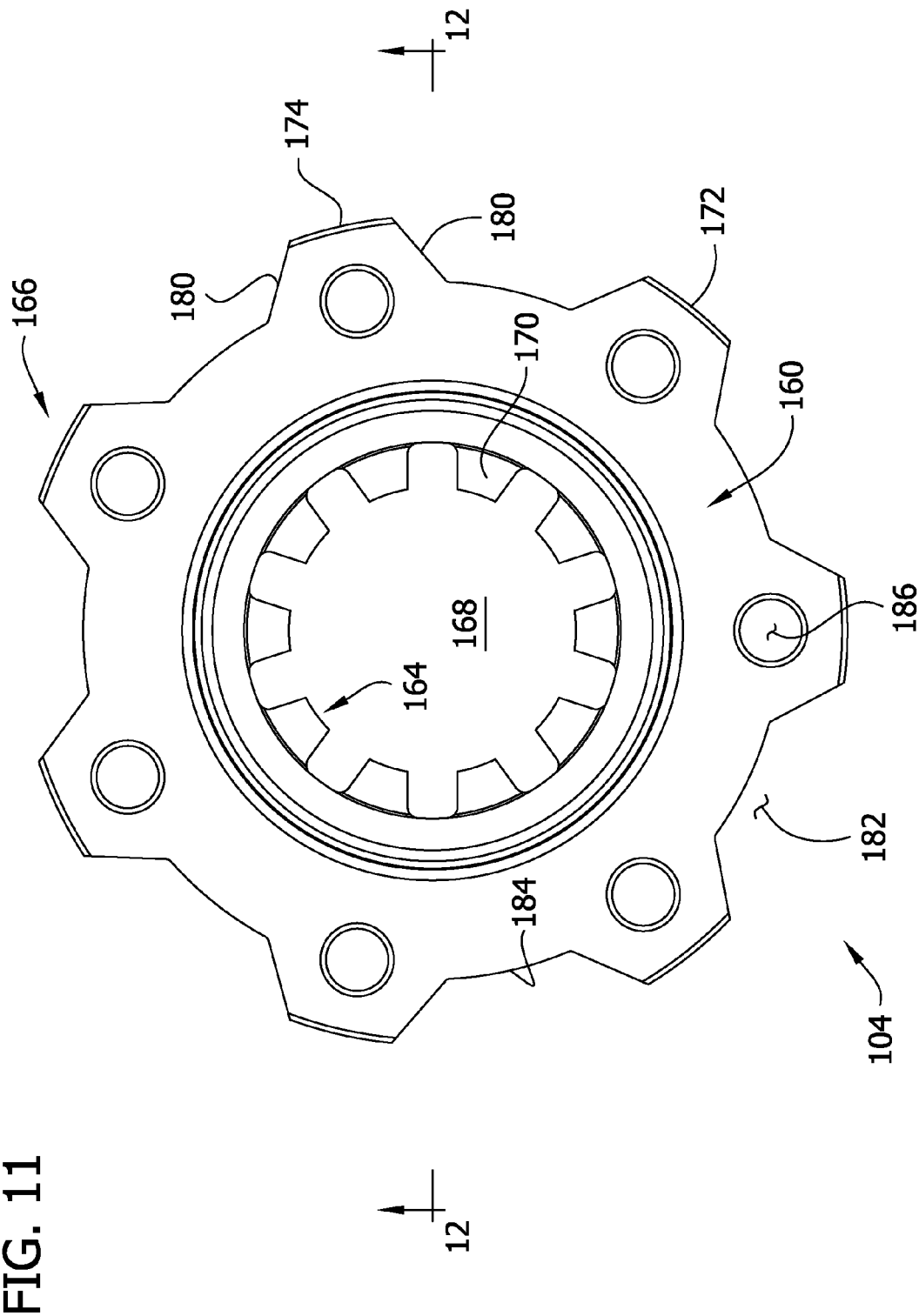
FIG. 11 is a front elevation of the hub.
Figure 12:
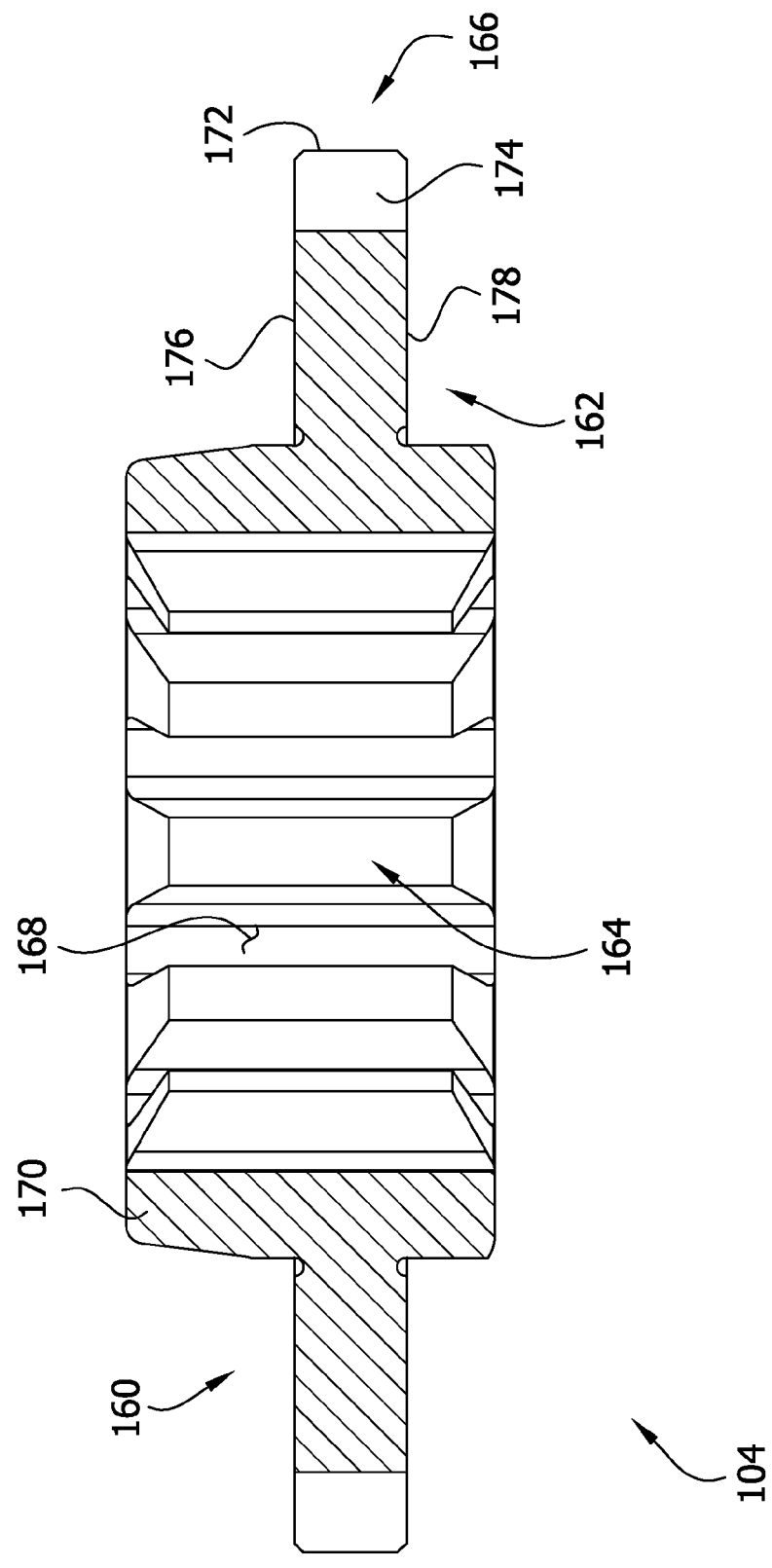
FIG. 12 is a section taken in the plane of line 12-12 of FIG. 11.

Referring to FIGS. 10-12, the hub 104 is configured to operatively engage the driven member O for mutual rotation with the driven member. The hub 104 has a forward facing hub surface, generally designated by 160, and a rearward facing hub surface, generally designated by 162, opposite the forward facing hub surface. An inward facing hub surface, generally designated by 164, opposite an outward facing hub surface, generally designated by 166, defines a central hub opening 168 for receiving the driven member O. The inward facing hub surface 164 has a plurality of splines 170 extending radially inward into the central hub opening 168. The splines 170 are configured to be received in circumferentially aligned grooves (not shown) in the outward facing surface of the driven member O when the driven member is received in the central hub opening 168. The splines 170 align the hub 104 to the driven member O so that the hub rotates in unison with the driven member.

The outward facing hub surface 166 has interlocking features that engage complementary features of the damping web 106 to inhibit relative circumferential movement between the hub relative and an inner portion of the damping web. The outward facing hub surface 166 has seven circumferentially spaced plate lugs 172 extending radially outward from the outward facing hub surface. Although the illustrated embodiment includes seven hub lugs 172, other numbers of hub lugs (e.g., one or more) may also be used without departing from the scope of the invention. Each hub lug 172 has an outward facing lug surface 174, a forward facing lug surface 176, a rearward facing lug surface 178, and opposite side lug surfaces 180. The hub lugs 172 each have an axial thickness extending from the forward facing lug surface 176 to the rearward facing lug surface 178 and a circumferential width extending between the side lug surfaces 180. The width of the hub lugs 172 is larger than the thickness. As will discussed in further detail below, each of the hub lugs 172 is configured to be encased by the damping web 106 such that each of the outward facing, forward facing, rearward facing, and side lug surfaces 174, 176, 178, 180 contact the web and form an interface therewith. Engagement between the side lug surfaces 180 of a hub lug 172 and the damping web 106 aligns the hub 104 to the inner portion of the damping web to inhibit relative circumferential movement between the hub relative and the inner portion of the damping web. Engagement between the forward and rearward facing lug surfaces 176, 178 and the damping web 104 inhibits relative axial movement between the hub relative and the damping web.

Each adjacent pair of circumferentially spaced hub lugs 172 is spaced by a corresponding hub gap 182. Although the illustrated embodiment includes seven hub gaps 182, other numbers of hub gaps (e.g., one or more) may also be used to accommodate other numbers of hub lugs without departing from the scope of the invention. Each hub gap 182 is bounded by an inward facing gap surface 184 and adjacent side surfaces 180 of an adjacent pair of hub lugs 140. As will be discussed in greater detail below, each of the hub gaps 182 is configured to receive a portion of the damping web 106 to aid in fixing the hub 104 to the inner portion of the damping web.

The hub 104 includes a plurality of axially extending openings 186 configured to form a pin-and-slot connection with a portion of the damping web 106 to further secure the hub to the damping web. In the illustrated embodiment, one opening 186 is centered on each of the seven hub lugs 172, extending axially rearward into the hub 104 from the respective forward facing lug surface 176. Although the illustrated embodiment includes one opening 186 centered on each of the hub lugs 172, other numbers and locations of openings can also be used without departing from the scope of the invention. The openings 186 extend entirely through the hub 104, from the forward facing hub surface 176 through the rearward facing hub surface 178. In other embodiments, the openings can extend axially less than the entire thickness of the hub without departing from the scope of the invention. As will be discussed in further detail below, the openings 186 are configured to receive a portion of the damping web 106 to inhibit relative radial movement between the damping web and the hub 104. As will be appreciated by those skilled in the art, the hub 104 may be formed without lugs in the case of clutch assemblies used in lower torque applications.

Figure 4:
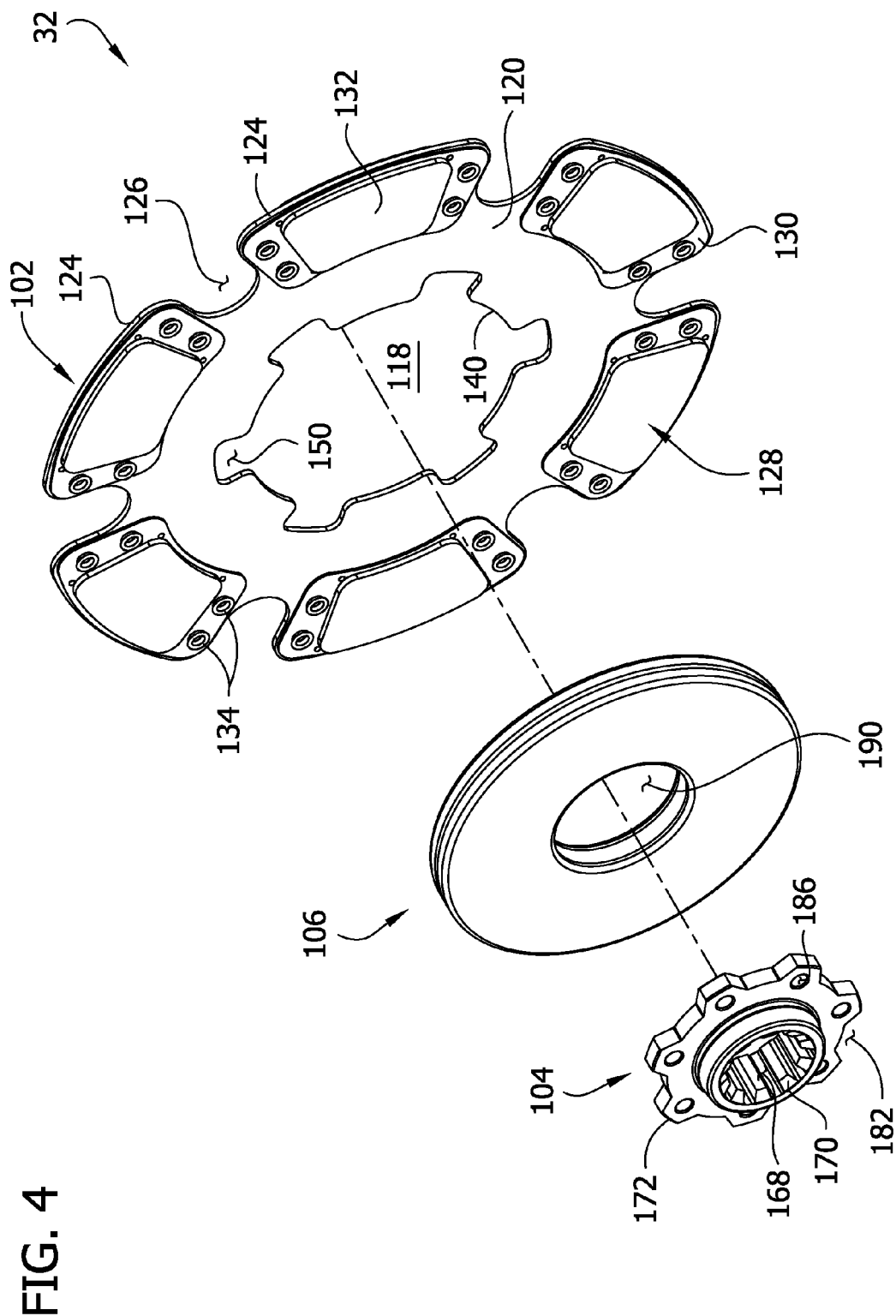
FIG. 4 is a separated perspective of the friction disc.
Figure 5:
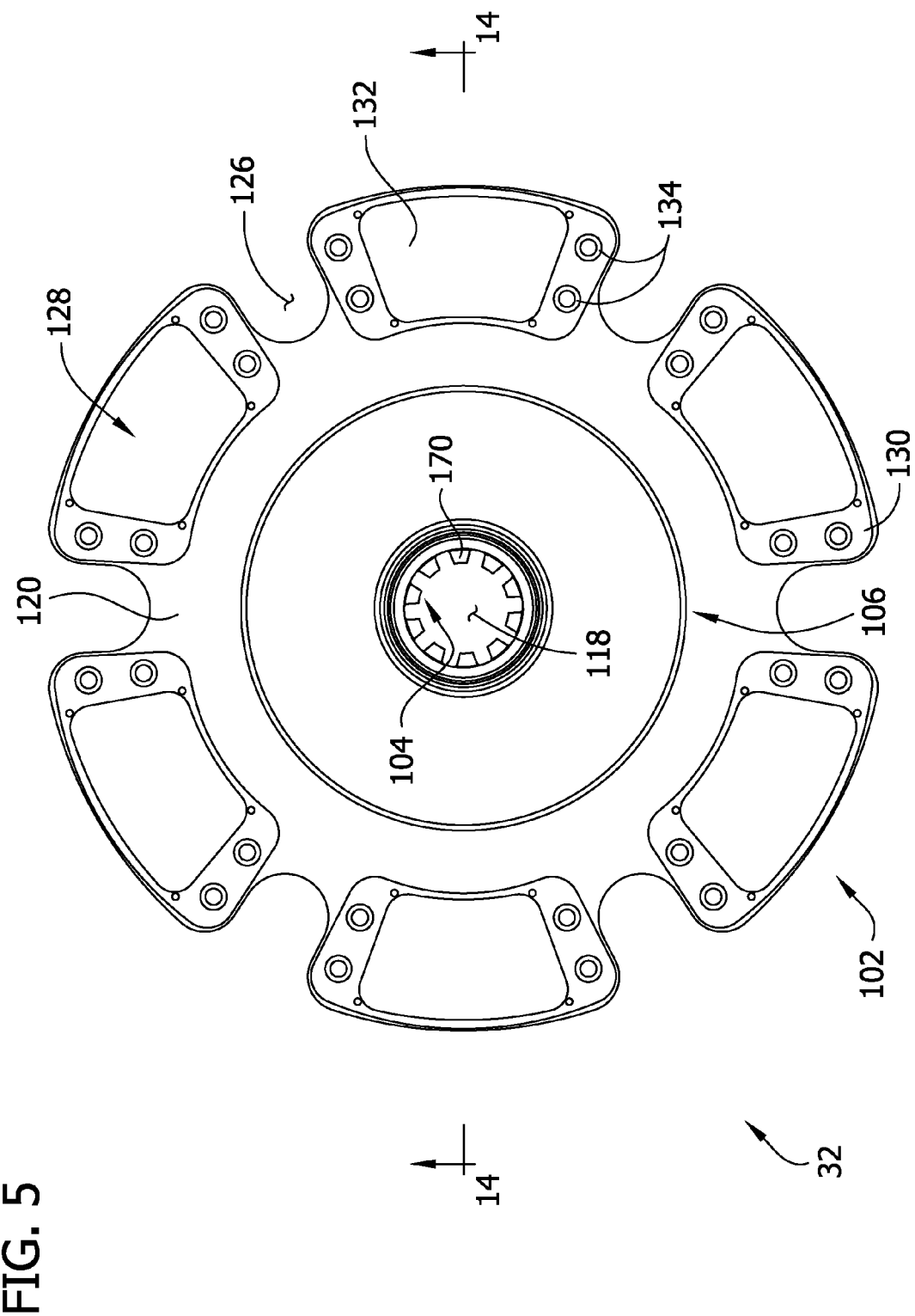
FIG. 5 is a front elevation of the friction disc.
Figure 6:
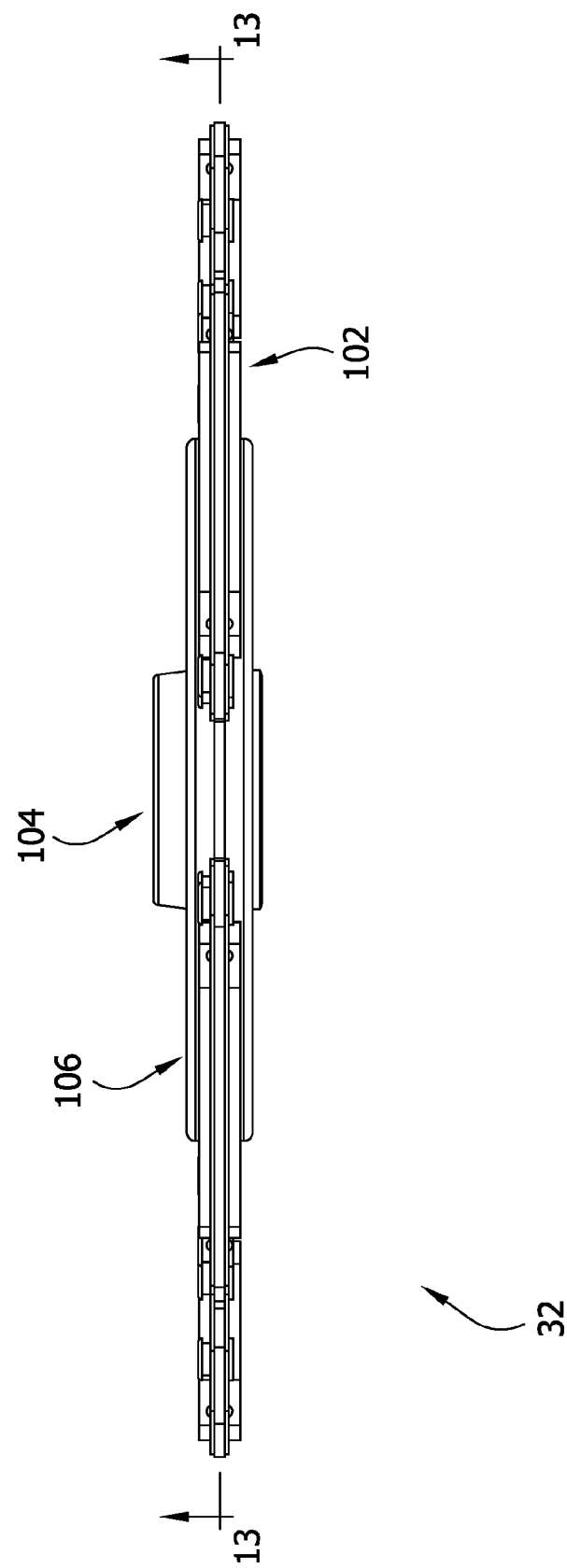
FIG. 6 is a side elevation of the friction disc.
Figure 13:
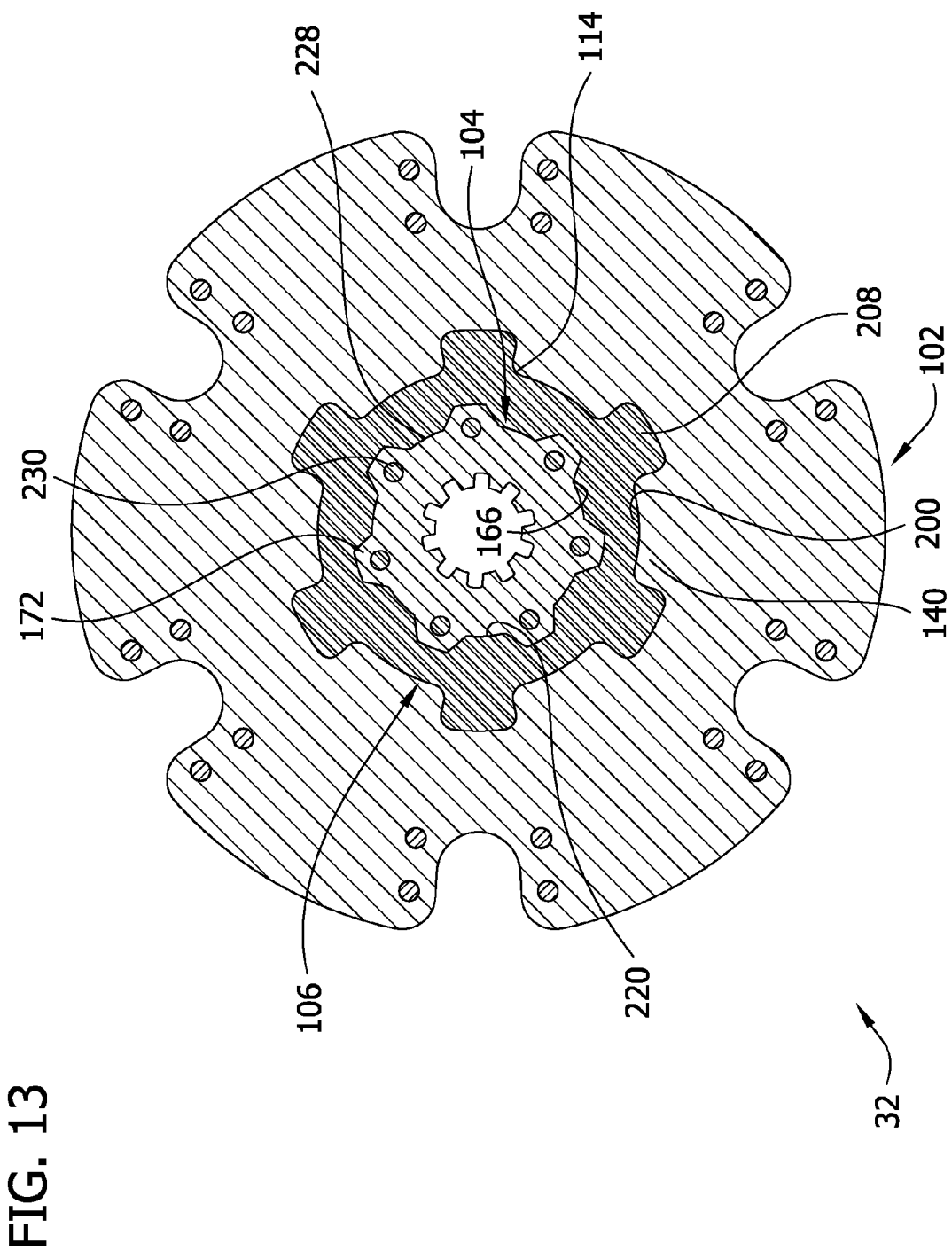
FIG. 13 is a section taken in the plane of line 13-13 of FIG. 6.
Figure 14:
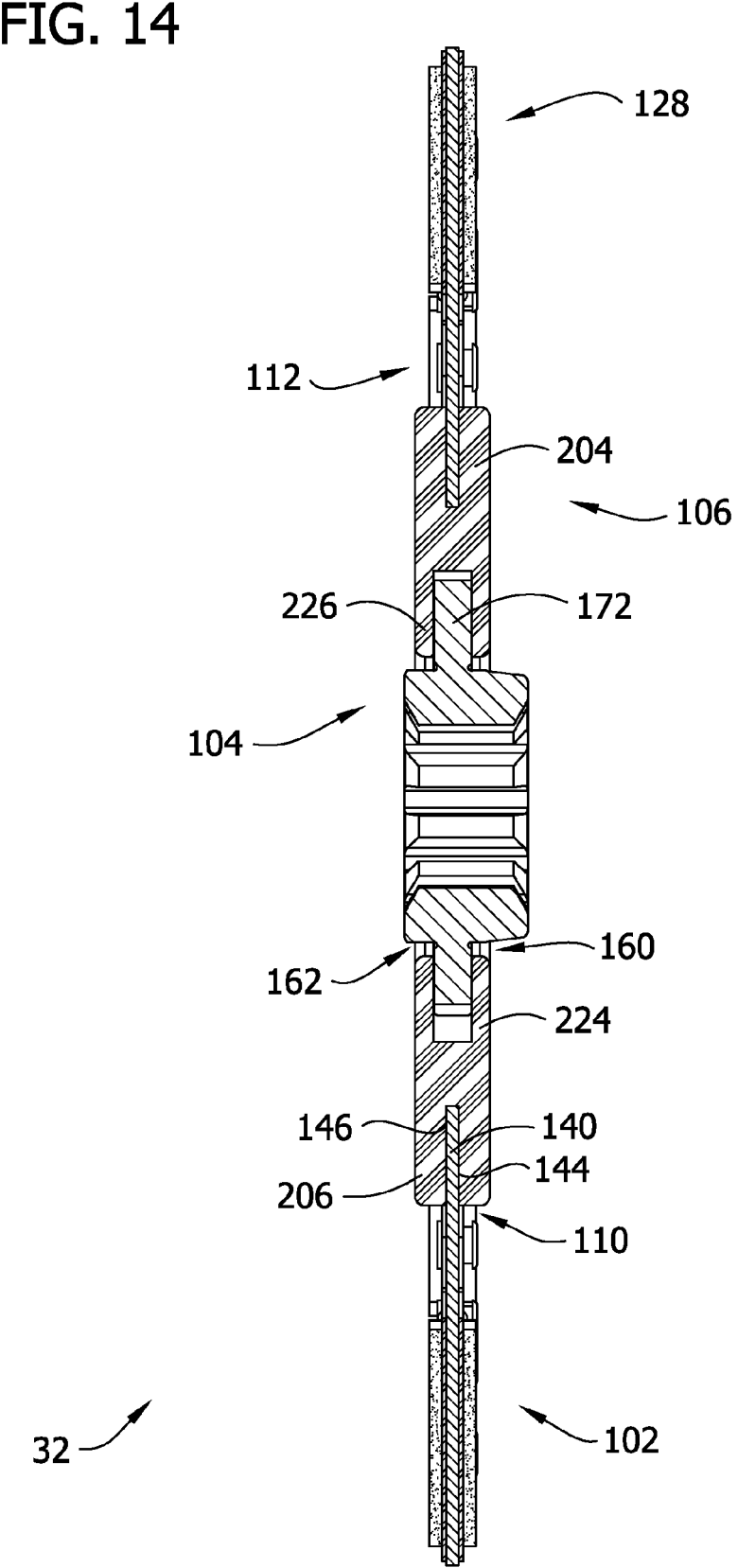
FIG. 14 is a section taken in the plane of line 14-14 of FIG. 5.

Referring to FIGS. 13 and 14, the damping web 106 connects the friction plate 102 to the hub 104 to transmit a torque between the friction plate and hub and thereby rotate the friction plate and hub together. The damping web 106 is secured to the inward facing surface 114 of the friction plate 102 to substantially inhibit relative movement between the outer portion of the damping web and the friction plate. Likewise, the damping web 106 is secured to the outward facing surface 166 of the hub 104 to substantially inhibit relative movement between an inner portion of the damping web and the hub. As shown in FIG. 4, the damping web 102 includes an axially extending central hole 190 configured and arranged to receive the driven member when the clutch assembly 20 is installed in an automobile.

The damping web 106 comprises a resiliently deformable material that is configured to resiliently deform when the friction plate 102 rotates relative to the hub 104. As the damping web resiliently deforms, it absorbs energy and limits the transmission of shock between the friction plate 102 and hub 104. In the illustrated embodiment the damping web 106 consists of a unitary piece of material. In a preferred embodiment, the damping web 106 comprises high temperature polyurethane such as UET high temperature polyurethane available from Ultra-Polymeric Engineered Technology, LLC of Sullivan, Mo. Other resiliently deformable materials can also be used without departing from the scope of the invention.

Figure 13A:
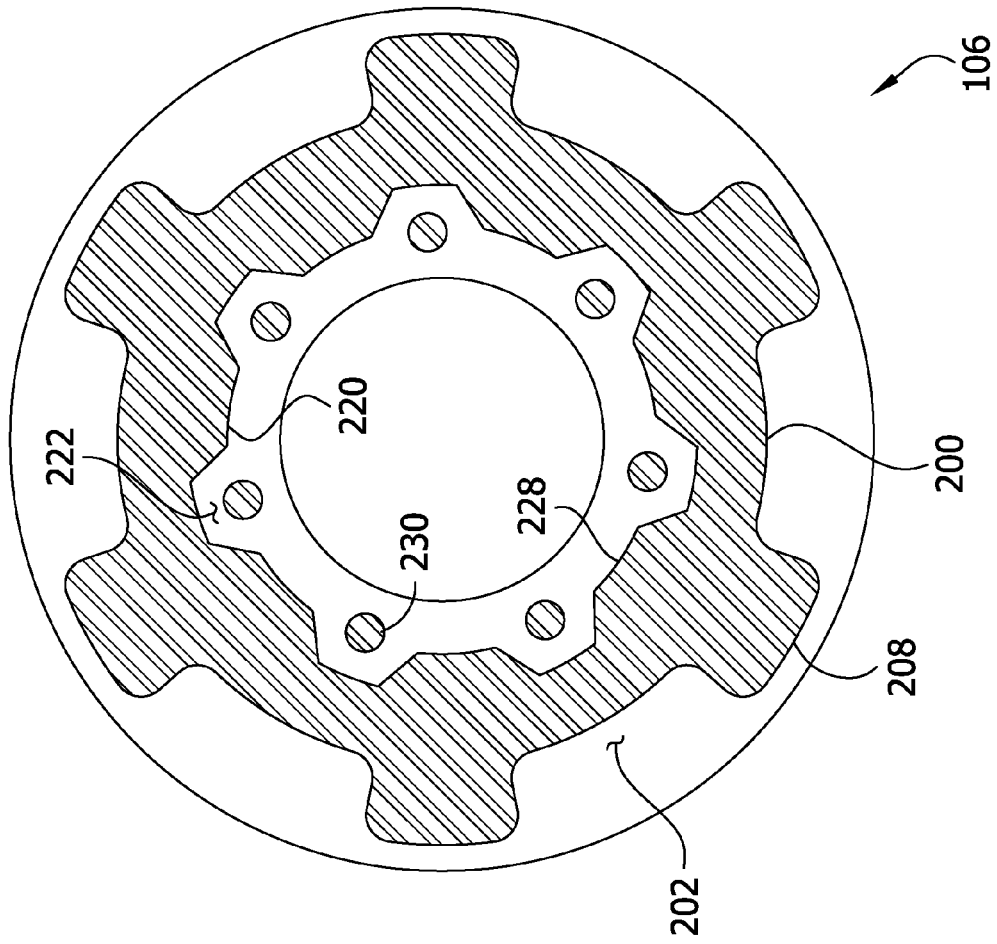
FIG. 13A is a section similar to FIG. 13 but having the friction plate and hub removed to reveal a damping web of the friction disc.

Referring to FIGS. 13 and 13A, the outer portion of the damping web 106 has an outer surface, generally designated by 200, which is shaped and arranged for complementary engagement with the inward facing plate surface 114. The outer web surface 200 has one outer recess 202 extending into the outer portion of the damping web 106 for each of the plate lugs 140. The outer recesses 202 are circumferentially spaced so that each of the plate lugs 140 is aligned with one of the outer recesses. The circumferentially spaced outer recesses 202 receive the circumferentially spaced plate lugs 140 to maintain alignment between the outer portion of the damping web 106 to the friction plate 102 and inhibit relative circumferential movement between the outer web surface 200 and the friction plate.

As shown in FIG. 14, the damping web 106 includes a front outward flange portion 204 that bounds a front side of each of the outer recesses 202 and a rear outward flange portion 206 that bounds a rear side of the outer recesses. The front outward flange portion 204 extends outwardly along the forward facing lug surfaces 144 of the plate lugs 140, and the rear outward flange 206 extends radially outward along the rearward facing lug surfaces 146 of the plate lugs. In the illustrated embodiment, each of the front and rear outward flange portions 204, 206 extend radially outward past the outward ends of the plate lugs 140 along a portion of the forward and rearward facing plate surfaces 110, 112, respectively. The friction plate 102 is received between the front and rear outward flange portions 204, 206 to inhibit relative axial movement between the friction plate and the damping web 106. Each plate lug 140 is received in a respective one of the outer recesses 202 and engages the outer web surface 200 and front and rear outward flange portions 204, 206 such that the damping web 106 overlaps and encases each of the plate lugs.

Referring to FIGS. 13 and 13A, the damping web 106 is shaped to entirely fill each of the plate gaps 150 between adjacent pairs of the plate lugs 140. The outer web surface 200 has an outwardly extending projection 208 for each of the gaps 150. In the illustrated embodiment, each outwardly extending projection 208 is somewhat dovetail-shaped to fill the respective plate gap 150 and has a larger circumferential width at its outer end than its inner end. The outwardly extending projection 208 extends into the respective gap 150 to engage the lug side surfaces 148 and inward facing gap surface 152 bounding the plate gap. The projections 208 and gaps 150 form a dovetail joint that inhibits disengagement upon radial loading between the damping web 106 and the friction plate 102.

The inner portion of the damping web 106 has an inner surface, generally designated by 220, which is shaped and arranged for complementary engagement with the outward facing surface 166 of the hub 106. The inner surface 220 has one inner recess 222 extending into the inner portion of the damping web 106 for each of the hub lugs 172. The inner recesses 222 are circumferentially spaced so that each of the hub lugs 172 is aligned with one of the inner recesses. The circumferentially spaced inner recesses 222 receive the circumferentially spaced hub lugs 172 to inhibit relative circumferential movement between the inner surface 220 of the damping web 106 and the hub 104.

As shown in FIG. 14, the damping web 106 includes a front inward flange portion 224 bounding a front side of each of the inner recesses 222 and a rear inward flange portion 226 bounding a rear side of the inner recesses. The front inward flange portion 224 extends radially inward along the forward facing lug surfaces 176 of the hub lugs 172, and the rear inward flange portion 226 extends radially inward along the rearward facing lug surfaces 178 of the hub lugs. In the illustrated embodiment, each of the front and rear inward flange portions 224, 226 extends inward past the inward ends of the hub lugs 172 along a portion of the forward and rearward facing hub surfaces 160, 162, respectively. The hub 104 is received between front and rear inward flange portions 224, 226 to inhibit relative axial movement between the hub and the damping web 106. Each hub lug 172 is received in a respective one of the inner recesses 222 and engages the inner web surface 220 and front and rear inward flange portions 224, 226 such that the damping web 106 overlaps and encases each of the hub lugs.

Referring again to FIGS. 13 and 13A, the damping web 106 is shaped to entirely fill each of the hub gaps 182 between adjacent ones of the hub lugs 172. For each of the hub gaps 182, the damping web 106 includes a inwardly extending projection 228. The inwardly extending projections 228 are circumferentially spaced to align with the hub gaps 182. Each of the inwardly extending projections 228 extends into the respective gap 182 and fills the gap, engaging the lug side surfaces 180 and outward facing gap surface 184 bounding the gap.

The damping web 106 is preferably configured to inhibit relative radial movement between the inner web surface 220 and the outward facing hub surface of the 166. The damping web 106 includes an axially extending protrusion 230 for each of the axially extending openings 186 extending through the hub 104. The protrusions 230 are arranged to align with the hub openings 186. Each of the protrusions 230 extends into the respective hub opening 186, filling the hub opening. In the illustrated embodiment, the protrusions 230 extend axially from the front inward flange portion 224, through the respective hub opening 186, to the rear inward flange portion 226. The protrusions 230 extend through the entire axial thickness of the hub lugs 172 and axially span the entire inner recesses 222 between the front and rear inward flange portions 224, 226. When the protrusions 230 are received in the openings 186, they engage the central portion of the hub lugs 172 to resist the tendency of the damping web to move radially outward relative to the hub 104 under centripetal loading as the friction disc 32 rotates with the driving member I.

Referring again to FIGS. 1 and 2, the primary and secondary pressure plates 24, 26 are normally in the engaged position in use. However, when the vehicle operator actuates the clutch assembly 20 (e.g., by depressing a clutch pedal (not shown) of a vehicle), the clutch assembly is configured to move the primary and secondary pressure plates 24, 26 axially to the disengaged position. In the disengaged position, the first and second friction discs 32, 34 are disengaged from the driving member I and rotate independently of the driving member. In general, the friction discs 32, 34 and the driven member O rotate at a slower speed than the driving member I when the pressure plates 24, 26 are in the disengaged position. When the vehicle operator releases the clutch assembly 20 (e.g., by releasing the clutch pedal of the vehicle), the pressure plates 24, 26 and flywheel F engage the friction discs 32, 34, which are rotating at a lower speed.

Upon initial engagement between the pressure plates 24, 26, flywheel F, and friction discs 32, 34, shock can be transmitted between the components due to the difference in the rotational speed of the components. However, the friction discs 32, 34 and, more particularly, the damping webs 106 limit the transmission of shock between the components.

Initially, when the friction plates 102 of the friction discs 32, 34 engage the pressure plates 24, 26 and flywheel F, the plates rotate together with the driving member I at a rotational speed different than the hub 104. Each friction plate 102 imparts torque on the respective damping web 106, which transmits the torque to the hub 104. The rotational inertia of the hub 104 and driven member O, which are rotating together at a slower speed than the driving member I causes the damping web 106 to resiliently deform as it imparts torque upon the hub. The connection between the inward facing plate surface 114 of the friction plate 102 and the outer surface 200 of the damping web 106 inhibits circumferential movement of the outer web surface relative to the inward facing plate surface under the torque loads transmitted through the corresponding interface. Likewise, the connection between the outward facing hub surface 166 and the inner web surface 220 maintains alignment between the hub 104 and the inner portion of the damping web 106 to inhibit circumferential movement of the inner web surface relative to the outward facing hub surface under the torque loads transmitted through the corresponding interface. Rotation of the friction discs 32, 34 imparts centripetal force on their components. Because the damping web is deformable, it will tend to move radially outward in response to the centripetal force. However, the projections 230 engage the hub lugs 172 in the openings 186, to inhibit the damping web 106 from moving radially outward relative to the hub 106 in response to the centripetal force.

Figure 15:
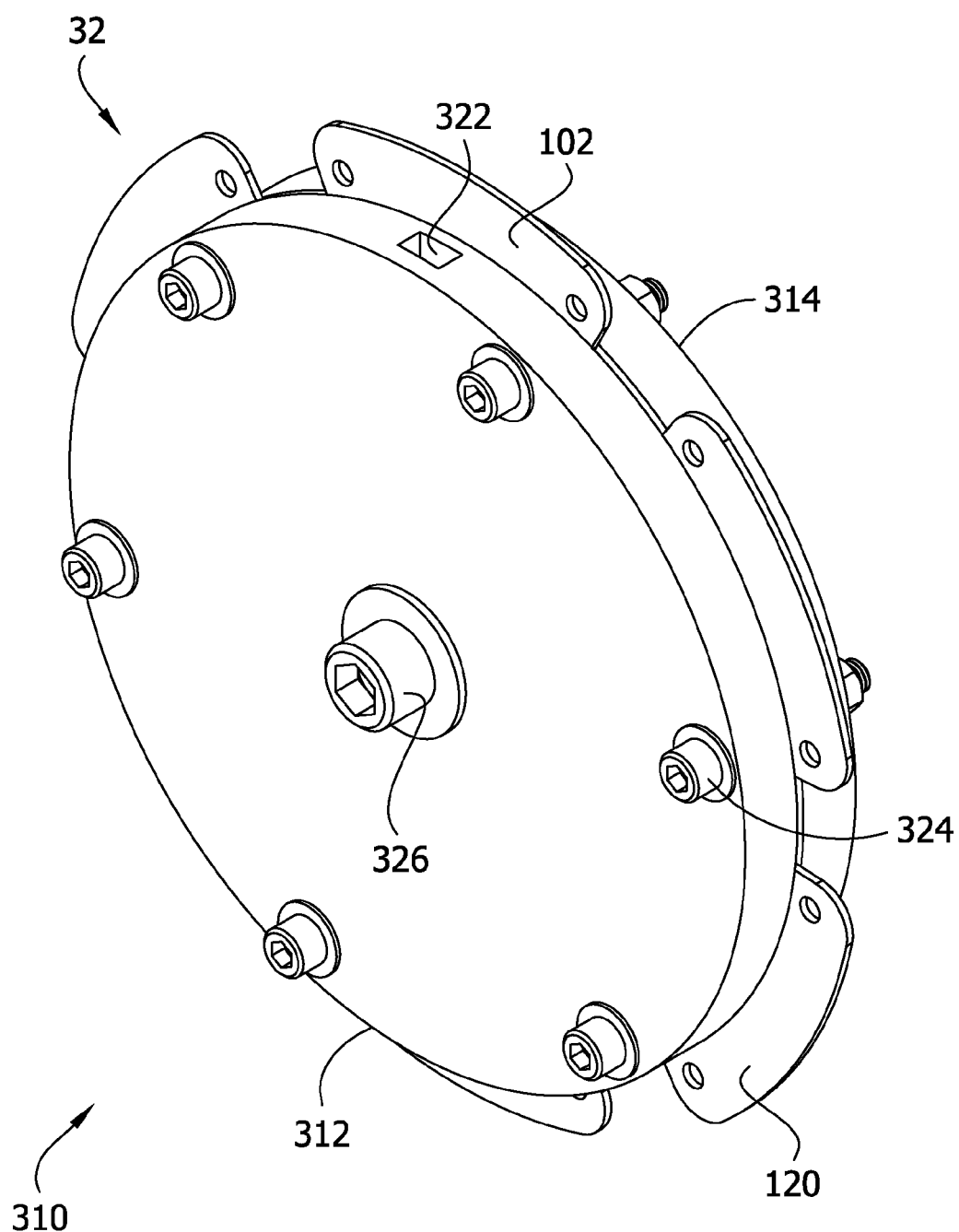
FIG. 15 is a perspective of the friction plate and hub installed in a mold.
Figure 16:
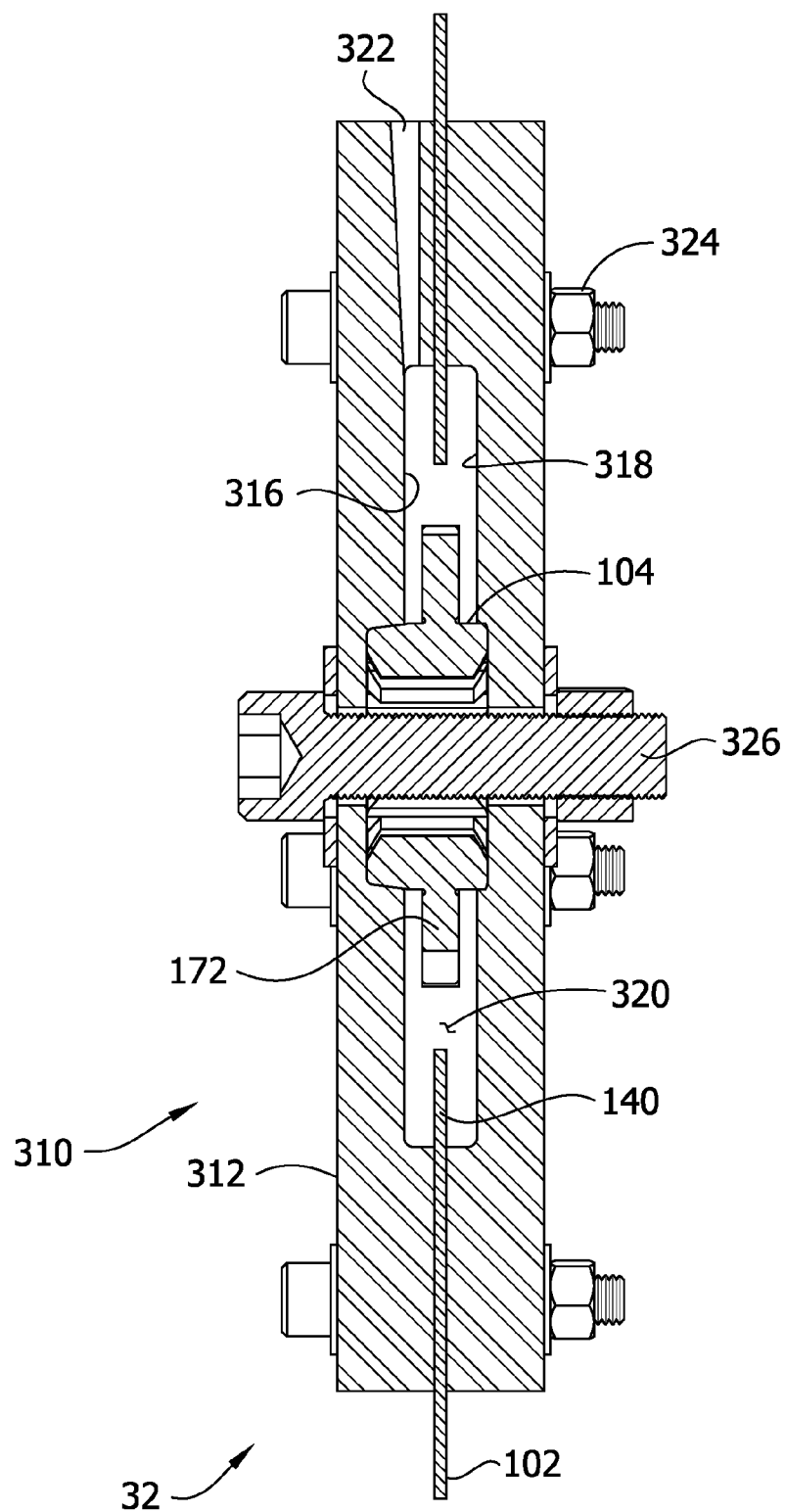
FIG. 16 is a cross section of the mold with friction plate and hub installed.

Referring to FIGS. 15 and 16, a mold used to manufacture the friction disc 32 is generally designated by 310. The mold 310 includes a front mold member 312 and a rear mold member 314 configured to be secured to the friction plate 102 and hub 104 to hold the friction plate and hub in coaxial alignment in the mold. Each of the front and rear mold members 312, 314 has an interior surface 316, 318 bounding a void 320 when assembled together as a mold. When the friction plate 102 and hub 104 are secured in the mold 310, the plate lugs 140 and hub lugs 172 are positioned in the void 320 and the void extends between the plate lugs and hub lugs. A mold inlet 322 extends through the front mold member 312 and fluidly connects the exterior of the mold 310 to the mold void 320.

In the illustrated embodiment of the mold 310, outer mounting fasteners 324 extend through mounting holes in each of the mold members 312, 314 that are aligned with friction pad assembly mounting holes in the base plate 120 to secure the friction plate 102 in position in the mold. A central mounting fastener 326 extends through central mounting holes in each of the mold members 312 and the central hub opening 168 to engage the inward facing hub surface 164 in the mold void 320 and thereby secure the hub 104 in position in the mold.

In one method of manufacturing a friction disc 32, the manufacturer secures the friction plate 102 and hub 104 in the mold 310 so the friction plate and hub are coaxially aligned. In the illustrated embodiment, the plate mounting fasteners 324 are installed in the outer mounting holes of the front and rear mold members 312, 314 to secure the mold 310 to the plate. The central fastener 326 is installed in the central mounting holes to secure the hub in the mold 310.

When the friction plate 102 and hub 104 are secured in the mold 310, the plate lugs 140 and hub lugs 172 are positioned in the void 320.

To form the damping web 106, a curable material (not shown), such as curable high temperature polyurethane, is poured through the mold inlet 322 and into the mold void 320. As the curable material fills the mold void 320 it encases the plate lugs 140 and hub lugs 172 as described above. Preferably, filling the mold void 320 include filling the axially extending openings 186 in the hub 104 with the curable material so the damping web 106 has protrusions 230 when cured.

After filling the mold 310 with curable material, the curable material is cured in the mold to form a resiliently deformable damping web 106. After curing, the friction plate 102, hub 104, and damping web 106 are removed from the mold 310. Once demolded, the method of manufacturing provides a friction disc 32 in which the damping web 106 includes an inner portion that is circumferentially fixed to hub 104 and in an outer portion that is circumferentially fixed to the friction plate 102 so the friction plate and the hub are resiliently moveable relative to each other. The resiliently deformable damping web 106 limits transmission of shock between the plate and the hub.

Having described the invention in detail, it will be apparent that modifications and variations are possible without departing from the scope of the invention defined in the appended claims. For example, the friction disc may be used in other types of clutches such as wet clutches.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A friction disc for use in a clutch assembly, the friction disc comprising:
   a plate having a forward facing plate surface, a rearward facing plate surface opposite said forward facing plate surface, an inward facing plate surface, and an outward facing plate surface opposite said inward facing plate surface, at least one of the forward facing plate surface and the rearward facing plate surface being configured to operatively engage a rotatable driving member for mutual rotation therewith, the inward facing plate surface having a cantilevered plate lug extending radially inwardly from the inward facing plate surface to a free end having an inner lug radius defining a minimum plate radius;
   a hub having an inward facing hub surface, an outward facing hub surface opposite said inward facing hub surface, and opposite axially facing surfaces, the inward facing hub surface being configured to operatively engage a driven member for mutual rotation therewith, the outward facing hub surface having a cantilevered hub lug extending radially outwardly from the outward facing hub surface to a free end having an outer lug radius that is less than said inner lug radius of the plate, said hub lug having a thickness measured between axially facing hub lug surfaces and a width measured orthogonal to the thickness, said axial thickness being less than said width; and
   a damping web connecting the plate to the hub to transmit torque between the plate and the hub to thereby rotate the plate and the hub mutually, the damping web comprising a resiliently deformable material that limits transmission of shock between the plate and the hub, the damping web including an inner portion having an inner surface and an outer portion having an outer surface, the outer surface of the damping web having an outer recess extending into the outer portion for receiving the radially inwardly extending plate lug therein to inhibit circumferential movement of the outer surface of the damping web relative to the plate, the inner surface of the damping web having an inner recess extending into the inner portion for receiving the radially outwardly extending hub lug therein to inhibit circumferential movement of the inner surface of the damping web relative to the hub.

2. A friction disc as set forth in claim 1 wherein the hub has an opening extending axially into the hub from at least one of said axially facing surfaces of the hub.

3. A friction disc as set forth in claim 2 wherein the damping web comprises a protrusion received in the opening to inhibit radial movement of the inner portion of the damping web relative to the hub.

4. A friction disc as set forth in claim 1 wherein the damping web consists of a one piece unitary piece of material.

5. A friction disc as set forth in claim 4 wherein the damping web comprises high temperature polyurethane.

6. A friction disc as set forth in claim 1 wherein:
   the inward facing plate surface has a plurality of circumferentially spaced plate lugs including said plate lug extending radially inwardly from the inward facing plate surface;
   the outer surface of the damping web has a plurality of circumferentially spaced outer recesses including said outer recess extending into the outer portion for receiving said plurality of circumferentially spaced plate lugs therein to inhibit circumferential movement of the outer surface of the damping web relative to the plate; and
   each of said plurality of plate lugs aligns with one of said plurality of damping web outer recesses.

7. A friction disc as set forth in claim 6 wherein:
   the outward facing hub surface has a plurality of circumferentially spaced hub lugs including said hub lug extending radially outwardly from the outward facing hub surface;
   the inner surface of the damping web has a plurality of circumferentially spaced inner recesses including said inner recess extending into the inner portion for receiving said plurality of circumferentially spaced hub lugs therein to inhibit circumferential movement of the inner surface of the damping web relative to the hub; and
   each of said plurality of hub lugs aligns with one of said plurality of damping web inner recesses.

8. A friction disc as set forth in claim 7 wherein each adjacent pair of said plurality of circumferentially spaced plate lugs is spaced by a corresponding gap, each of said corresponding gaps being narrower at an inner end than at an outer end thereof.

9. A friction disc as set forth in claim 8 wherein the damping web is shaped to fill each of said gaps entirely.

10. A friction disc as set forth in claim 6 wherein each of said plurality of circumferentially spaced plate lugs has a circumferentially extending plate lug width that is greater than an axially extending plate lug thickness.

11. A friction disc as set forth in claim 7 wherein the damping web completely overlaps and encases each of said plurality of circumferentially spaced plate lugs.

12. A friction disc as set forth in claim 7 wherein the damping web completely overlaps and encases each of said plurality of circumferentially spaced hub lugs.

13. A friction disc as set forth in claim 7 wherein the hub has a plurality of openings including said opening extending axially into the hub from at least one of said axially facing surfaces of the hub.

14. A friction disc as set forth in claim 13 wherein the damping web comprises a plurality of protrusions, each of said plurality of protrusions being received in one of said plurality of openings to inhibit radial movement of the inner portion of the damping web relative to the hub.

15. A friction disc as set forth in claim 13 wherein each of said plurality of openings extends entirely through the hub.

16. A friction disc as set forth in claim 13 wherein each of said plurality of openings is centered on a corresponding one of said plurality of hub lugs.

17. A clutch comprising: a pressure plate selectively movable along an axis of the clutch, the pressure plate being connected to a driving member for mutual rotation therewith; and a friction disc connected to a driven member for mutual rotation therewith, the friction disc comprising: a plate having a forward facing plate surface, a rearward facing plate surface opposite said forward facing plate surface, an inward facing plate surface, and an outward facing plate surface opposite said inward facing plate surface, at least one of the forward facing plate surface and the rearward facing plate surface being configured to operatively engage the pressure plate for mutual rotation with the driving member, the inward facing plate surface having a cantilevered plate lug protruding radially inwardly from the inward facing plate surface to a free end defining an innermost radius of the plate; a hub having an inward facing hub surface, an outward facing hub surface opposite said inward facing hub surface, and opposite axially facing hub surfaces, the inward facing hub surface being rotationally fixed to the driven member for mutual rotation therewith, the outward facing hub surface having a cantilevered hub lug protruding radially outwardly from the outward facing hub surface to a free end said hub lug having a thickness measured between opposite axially facing hub lug surfaces and a width measured orthogonal to the axial thickness, said axial thickness being less than said width; and a damping web covering at least part of at least one of the opposite axially facing hub surfaces of the hub and connecting the plate to the hub to transmit torque between the plate and the hub to thereby rotate the plate and the hub mutually, the damping web comprising a resiliently deformable material that limits transmission of shock between the plate and the hub, the damping web including an inner portion having an inner surface and an outer portion having an outer surface, the outer surface of the damping web having an outer recess extending into the outer portion receiving the radially inwardly extending plate lug therein thereby inhibiting circumferential movement of the outer surface of the damping web relative to the plate, the inner surface of the damping web having an inner recess extending into the inner portion receiving the radially outwardly extending hub lug therein thereby inhibiting circumferential movement of the inner surface of the damping web relative to the hub, wherein the outer recess of the damping web has a minimum radius and the inner recess of the damping web has a maximum radius that is less than the minimum radius of the outer recess.

18. A friction disc for use in a clutch assembly, the friction disc comprising:
a plate having a forward facing plate surface, a rearward facing plate surface opposite said forward facing plate surface, an inward facing plate surface, and an outward facing plate surface opposite said inward facing plate surface, at least one of the forward facing plate surface and the rearward facing plate surface being configured to operatively engage a rotatable driving member for mutual rotation therewith, the inward facing plate surface having a cantilevered plate lug protruding radially inwardly therefrom to a free end, the plate lug having a width extending between opposite circumferential ends and a radial height less than the width, each of said opposite circumferential ends extending along a straight line;
a hub having opposite axially facing hub surfaces, an inward facing hub surface, and an outward facing hub surface opposite said inward facing hub surface, the inward facing hub surface being configured to operatively engage a driven member for mutual rotation therewith; and
a damping web covering at least part of at least one of the opposite axially facing hub surfaces of the hub and connecting the plate to the hub to transmit torque between the hub to thereby rotate the plate and the hub damping web comprising a resiliently deformable least one of the and connecting the plate and the hub to thereby rotate the plate and the hub mutually, the damping web comprising a resiliently deformable material that limits transmission of shock between the plate and the hub, the damping web including an inner portion having an inner surface and an outer portion having an outer surface, the outer surface of the damping web having an outer recess extending into the outer portion receiving the radially inwardly extending plate lug therein thereby inhibiting circumferential movement of the outer surface of the damping web relative to the plate, the inner surface of the damping web receiving a portion of the hub to inhibit circumferential movement of the inner surface of the damping web relative to the hub, wherein the inner surface of the inner portion has a maximum radius and the outer surface of the outer portion has a minimum radius that is greater than the maximum radius of the inner surface of the inner portion.

19. A friction disc for use in a clutch assembly, the friction disc comprising:
a plate having a forward facing plate surface, a rearward facing plate surface opposite said forward facing plate surface, an inward facing plate surface, and an outward facing plate surface opposite said inward facing plate surface, at least one of the forward facing plate surface and the rearward facing plate surface being configured to operatively engage a rotatable driving member for mutual rotation therewith, the inward facing plate surface having a cantilevered plate lug protruding radially inwardly therefrom to a free end defining an innermost radius of the plate;
a hub having opposite axially facing hub surfaces, an inward facing hub surface, and an outward facing hub surface opposite said inward facing hub surface, the inward facing hub surface being configured to operatively engage a driven member for mutual rotation therewith, the outward facing hub surface having a hub lug protruding radially outwardly therefrom to a free end so that said hub lug is cantilevered, said hub lug having a thickness measured between opposite axially facing hub lug surfaces and a width measured orthogonal to the thickness, said thickness being less than said width; and a damping web covering at least part of each of the opposite axially facing hub surfaces of the hub and connecting the plate to the hub to transmit torque between the plate and the hub to thereby rotate the plate and the hub mutually, the damping web comprising a resiliently deformable material that limits transmission of shock between the plate and the hub, the damping web including an inner portion having an inner surface and an outer portion having an outer surface, the outer surface of the damping web having an outer recess extending into the outer portion receiving the radially inwardly extending plate lug therein thereby inhibiting circumferential movement of the outer surface of the damping web relative to the plate, the inner surface of the damping web having an inner recess extending into the inner portion receiving the radially outwardly extending hub lug therein thereby inhibiting circumferential movement of the inner surface of the damping web relative to the hub, wherein the outer recess of the damping web has a minimum radius and the inner recess of the damping web has a maximum radius that is less than the minimum radius of the outer recess.

* * * * *